(12) United States Patent
Harmon-Moore et al.

(10) Patent No.: US 11,773,944 B1
(45) Date of Patent: Oct. 3, 2023

(54) COMPLEX PLANETARY DESIGN UTILIZING PLANET GEOMETRY FOR STACKABLE AND REVERSIBLE PLANETARIES

(71) Applicant: Deere & Company, Moline, IL (US)

(72) Inventors: Cayle D. Harmon-Moore, Independence, KS (US); Douglas S. Base, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/086,024

(22) Filed: Dec. 21, 2022

(51) Int. Cl.
*F16H 1/46* (2006.01)
*F16H 1/36* (2006.01)
*F16H 57/08* (2006.01)
*F16H 1/28* (2006.01)

(52) U.S. Cl.
CPC .............. *F16H 1/46* (2013.01); *F16H 1/36* (2013.01); *F16H 57/082* (2013.01); *F16H 2001/289* (2013.01)

(58) Field of Classification Search
CPC ............. F16H 1/46; F16H 1/36; F16H 57/082
See application file for complete search history.

(56) References Cited

U.S. PATENT DOCUMENTS

| | | | |
|---|---|---|---|
| 5,472,386 A * | 12/1995 | Kish | F16H 1/28 475/903 |
| 6,946,818 B2 | 9/2005 | Cawthorne et al. | |
| 6,966,865 B2 * | 11/2005 | Drago | F16H 57/082 475/342 |
| 10,065,633 B2 | 9/2018 | Banshoya et al. | |

FOREIGN PATENT DOCUMENTS

| | | | |
|---|---|---|---|
| CN | 207374106 U | 5/2018 | |
| WO | WO-2011100499 A1 * | 8/2011 | F16H 1/28 |

* cited by examiner

*Primary Examiner* — Derek D Knight
(74) *Attorney, Agent, or Firm* — Taft Stettinius & Hollister LLP; Stephen F. Rost

(57) ABSTRACT

A complex planetary assembly includes an input, an output, a ring gear, a first stage planetary assembly and a second stage planetary assembly. The first stage planetary assembly includes a first sun gear, a first carrier including a first plurality of pins extending therefrom, and a first plurality of planet gears. Each of the first plurality of planet gears is rotatably coupled to one of the first plurality of pins. The second stage planetary assembly includes a second sun gear, a second carrier including a second plurality of pins extending therefrom, and a second plurality of planet gears. Each of the second plurality of planet gears is rotatably coupled to one of the second plurality of pins. At each of the first or second plurality of pins on the first or second carrier, at least two planet gears of the first or second plurality of planet gears are coupled and coaxially arranged adjacent to one another.

20 Claims, 10 Drawing Sheets

COMPLEX PLANETARY DESIGN UTILIZING PLANET GEOMETRY FOR STACKABLE AND REVERSIBLE PLANETARIES

FIELD OF THE DISCLOSURE

The present disclosure relates to a work machine, and in particular, to an agricultural machine having a complex planetary system.

BACKGROUND

A power system is utilized for providing power to propel a work machine such as an agricultural work machine. The power system may include a planetary system through which power is transferred to achieve different ratios between an input and an output of the power system.

SUMMARY

In one implementation of the present disclosure, a complex planetary assembly includes an input, an output, a ring gear, a first stage planetary assembly and a second stage planetary assembly. The first stage planetary assembly includes a first sun gear, a first carrier including a front face and a first plurality of pins extending therefrom, and a first plurality of planet gears. Each of the first plurality of planet gears is rotatably coupled to one of the first plurality of pins on the first carrier. The second stage planetary assembly includes a second sun gear, a second carrier including a front face and a second plurality of pins extending therefrom, and a second plurality of planet gears. Each of the second plurality of planet gears is rotatably coupled to one of the second plurality of pins on the second carrier. At each of the second plurality of pins on the second carrier, at least two planet gears of the second plurality of planet gears are coupled thereto. The at least two planet gears of the second plurality of planet gears are coaxially arranged adjacent to one another.

In one example of this implementation, the ring gear is rotatably coupled to the first plurality of planet gears and the second plurality of planet gears. In another example, the first sun gear and second sun gear are coaxially arranged along the same rotation axis. In a third example, at each of the first plurality of pins on the first carrier, at least two planet gears of the first plurality of planet gears are coupled thereto and the at least two planet gears of the first plurality of planet gears are coaxially arranged adjacent to one another.

In a fourth example, the at least two planet gears of the second plurality of planet gears are in contact with one another. In a fifth example, the first plurality of planet gears are identical to the second plurality of planet gears. In a sixth example, the first plurality of planet gears and the second plurality of planet gears include the same module, diameter, thickness, or number of gear teeth. In a seventh example, a plurality of idler gears is coupled to the first carrier, each of the plurality of idler gears is rotatably coupled to one of the first plurality of pins on the first carrier and coupled between the first sun gear and one planet gear of the first plurality of planet gears.

In an eighth example, the first plurality of planet gears, the second plurality of planet gears, and the plurality of idler gears are identical. In a tenth example, the first plurality of planet gears, the second plurality of planet gears, and the plurality of idler gears include the same module, diameter, thickness, or number of gear teeth.

In another implementation of the present disclosure, a complex planetary assembly includes an input and an output, a ring gear, a first stage reverser planetary assembly and a second stage planetary assembly. The first stage reverser planetary assembly includes a first sun gear, a first carrier having a front face and a first plurality of pins extending from the first face, a first plurality of planet gears, each of the first plurality of planet gears being rotatably coupled to one of the first plurality of pins on the first carrier, and a plurality of idler planetary gears coupled to the first carrier, each of the plurality of idler gears being rotatably coupled to one of the first plurality of pins on the first carrier and coupled between the first sun gear and one planet gear of the first plurality of planet gears. The second stage planetary assembly includes a second sun gear, a second carrier having a front face and a second plurality of pins extending therefrom, and a second plurality of planet gears, each of the second plurality of planet gears being rotatably coupled to one of the second plurality of pins on the second carrier. At each of the first plurality of pins on the first carrier, at least two planet gears of the first plurality of planet gears or at least two idler gears of the plurality of idler gears are coupled thereto. The at least two planet gears of the first plurality of planet gears and the at least two idler gears of the plurality of idler gears are coaxially arranged adjacent to one another on the respective pin.

In one example of this implementation, the ring gear is rotatably coupled to the first plurality of planet gears and the second plurality of planet gears. In a second example, at each of the second plurality of pins on the second carrier, at least two planet gears of the second plurality of planet gears are coupled thereto, and the at least two planet gears of the second plurality of planet gears are coaxially arranged adjacent to one another. In a third example, the at least two planet gears of the first plurality of planet gears are in contact with one another.

In a fourth example, the first plurality of planet gears, the second plurality of planet gears, and the plurality of idler gears are identical to one another. In a fifth example, the first plurality of planet gears, the second plurality of planet gears, and the plurality of idler gears include the same module, diameter, thickness, or number of gear teeth. In another example, the number of planet gears and the number of idler gears coupled to each of the first plurality of pins is the same.

In a further implementation of the present disclosure, a complex planetary assembly includes an input and an output, a ring gear, a first stage reverser planetary assembly and a second stage planetary assembly. The first stage reverser planetary assembly includes a first sun gear, a first carrier comprising a front face and a first plurality of pins extending from the first face, a first plurality of planet gears, each of the first plurality of planet gears being rotatably coupled to one of the first plurality of pins on the first carrier, and a plurality of idler planetary gears coupled to the first carrier, each of the plurality of idler gears being rotatably coupled to one of the first plurality of pins on the first carrier and coupled between the first sun gear and one planet gear of the first plurality of planet gears. The second stage planetary assembly includes a second sun gear, a second carrier comprising a front face and a second plurality of pins extending therefrom, and a second plurality of planet gears, each of the second plurality of planet gears being rotatably coupled to one of the second plurality of pins on the second carrier. At each of the first plurality of pins on the first carrier, at least two planet gears of the first plurality of planet gears or at least two idler gears of the plurality of idler gears are coupled thereto and the at least two planet gears of the first plurality of planet gears and the at least two idler gears of the plurality of idler gears are coaxially arranged adjacent to one another on the respective pin. At each of the second plurality of pins on the second carrier, at least two planet gears of the second plurality of planet gears are coupled thereto, and the at least two planet gears of the second plurality of planet gears are coaxially arranged adjacent to one another.

In one example of this implementation, the ring gear is coupled to the first plurality of planet gears and the second plurality of planet gears. In another example, the number of planet gears of the first plurality of planet gears and the number of idler gears of the plurality of idler gears coupled to each of the first plurality of pins is the same as the number of planet gears of the second plurality of planet gears coupled to each of the second plurality of pins.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

Figure 1:
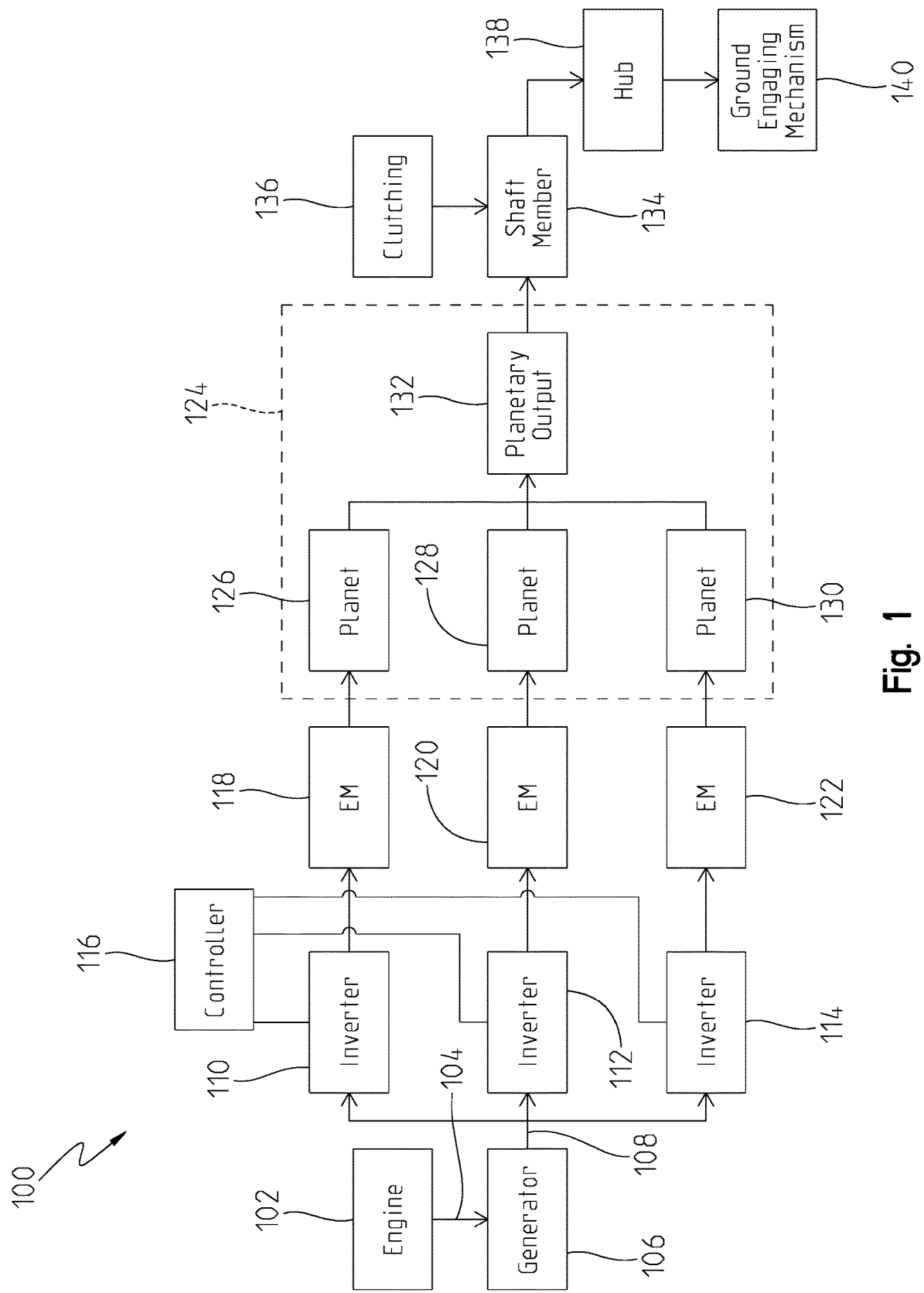
FIG. 1 is a schematic of a final drive system of an example work machine for providing power to wheels or tracks.

For the purposes of promoting an understanding of the principles of the present disclosure, reference will now be made to the implementations described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In some implementations, a planetary gearset may include a sun gear, a ring gear, and a plurality of planet gears coupled to a carrier. In several implementations, a complex planetary assembly, there may be more than a single planetary gearset coupled together to change or adjust the torque or speed output of the planetary gearset. For example, the ring and sun gear ratios define an overall ratio of the planetary gearset, but the planet gears transfer torque through the carrier to the sun or ring gear. A complex planetary assembly can be costly as each gear is generally of a different size and configuration, and this can result in a greater complexity due to additional hardware to the assembly. The complex planetary assembly can have various torque capacity limits as well. In this disclosure, various implementations are disclosed for improving the torque capacity to achieve different torque requirements as well as reduce part count and cost of the complex planetary assembly.

In some implementations, planetary gearsets may form part of a complex planetary assembly used in a final drive assembly. In some applications, the final drive assembly may include a single large power device such as an electric machine. An electric machine may be a machine using electromagnetic forces such as an electric motor, electric generator, and the like. As is known, an electric motor may convert electrical power to mechanical power, whereas an electric generator may convert mechanical power to electrical power.

In other implementations, the final drive assembly may utilize a hydraulic system for producing mechanical power to drive a wheel or track (i.e., a ground-engaging mechanism). The hydraulic system may include a pump and hydraulic motor, for example, for producing the necessary power to drive the ground-engaging mechanism. In several implementations, a final drive assembly may include a planetary gearset assembly to provide the necessary reduction of power to the ground-engaging mechanism.

Referring to FIG. 1, one implementation of a planetary gearset assembly is disclosed. Here, a power system 100 for controlling a final drive assembly of a work machine is illustrated. In this system, the machine may include an engine 102 or other power-producing device. In some implementations, the engine 102 may be a diesel engine. In other implementations, a battery or motor may be used to produce power. In the illustrated implementation, the power-producing device 102 produces mechanical power 104. In turn, the mechanical power 104 can be transferred to an electric generator 106 as shown in FIG. 1. The electric generator 106 in turn can convert the mechanical power 104 to electrical power 108.

The electric generator 106 may be coupled to an inverter which may control how much power is consumed by an electrical machine such as an electric motor. In the implementation of FIG. 1, a plurality of smaller electric machines may be used in place of a single, larger electric machine. The plurality of electric machines may include a first electric machine 118, a second electric machine 120, and a third electric machine 122. Each electric machine may be powered by an independent inverter. In FIG. 1, for example, a first inverter 110 may control an amount of power being sent to the first electric machine 118. A second inverter 112 may control an amount of power being sent to the second electric machine 120, and a third inverter 114 may control an amount of power being sent to the third electric machine 122.

In the present disclosure, the electric machines may receive electrical power from their respective inverter. In one implementation, one of the plurality of electric machines may be controlled such that it defines how the other electric machines function. In some implementations, a controller 116 may be in electrical communication with the plurality of inverters for communicating to each inverter how the respective plurality of electric machines should be controlled for a given application. Specifically, the controller 116 may command each inverter to output a speed or torque command to the respective electric machine in a coordinated manner so that the plurality of electric machines are in-sync with each other. Each electric machine may include its own power electronics which can ensure that the desired output is achieved. Thus, each of the plurality of electric machines may be controlled independently of the others. Although not shown, one or more sensors may be associated with a given electric machine and communicate with the inverter or controller 116.

As shown in the example application of FIG. 1, the power system 100 may include a planetary gearset assembly 124. The output of the plurality of electric machines may be transferred to the planetary gearset assembly 124 as shown. In one implementation, the planetary gearset assembly 124 may include a sun gear (not shown), a ring gear (not shown), a carrier (not shown), and a plurality of planet gears (or planets). The plurality of planet gears may be coupled to each of the plurality of electric machines. Thus, the plurality of planet gears may function as an input of the planetary gearset assembly. Power received via the plurality of planet gears may be transferred to an output 132 of the planetary gearset assembly 124. In other implementations where only a single electric machine is used, the output from the electric machine may be coupled to an input of the planetary gearset assembly 124.

In the implementation of FIG. 1, a first planet gear 126 may be powered by the first electric machine 118, a second planet gear 128 may be powered by the second electric machine 120, and a third planet gear 130 may be powered by the third electric machine 122. In other implementations, any number of planet gears may be utilized. Moreover, any planetary concept or arrangement (i.e., layout) may be used in the power system. This, for example, may include a simple planetary layout, a reverser planetary layout, a complex planetary layout, or any of the other known fundamental planetary arrangements or layouts.

The planetary output 132 may transfer power to a shaft member 134 as shown. Clutching assembly 136 may be coupled to the shaft member 134 to adjustably control its output to a hub 138 and ground-engaging mechanism 140.

In one implementation, a complex planetary assembly may include a first stage planetary gearset and a second stage planetary gearset. In some implementations, either the first or second stage planetary gearset may be a reverser planetary gearset with one or more idler planet gears. In one example, with a second stage reverser planetary gearset, the second stage gearset may have a higher torque and thus torque capacity can be problematic. However, in one implementation of this disclosure, the same geometry of each planet gear may be used in the complex planetary assembly. Moreover, in some implementations, two or more planet gears may be stackable and reversible as well as arranged along the same rotational axis to increase the torque carrying capacity of the overall assembly. In these implementations, the complex planetary assembly may include a pair of sun gears (one for each of the first and second stage planetary gearsets). The second stage planetary gearset, however, may include two or more planet gears instead of a single planet gear coupled to a carrier at each location thereof. In one implementation, each planet gear may utilize the same geometry including pitch diameter and number of teeth as the other planet gears on the second stage planetary gearset. In view of this, there may be a cost savings with stacked planet gears due to the use of the same geometrical characteristics of each planet gear. Specifically, there is a higher volume of the same sized gear and thus costs for tooling and the like may be reduced.

In another implementation of a complex planetary assembly, a first stage reverser planetary gearset may include three planets and a second stage standard configuration planetary gearset may include four planets. In many conventional gearsets, the planets on the first stage reverser planetary gearset may be different parts with different face widths and tooth counts from the planets used in the second stage planetary gearset. If, however, in an implementation where the planets used in the first stage reverser planetary gearset and the second stage standard planetary gearset are the same, then the six planets on the first stage reverser planetary gearset and the four planets on the second stage planetary gearset can be reduced to the same planet used in both stages. Moreover, the second stage planetary gearset may include stacked planets such that eight or more planet gears may be used. Further, if greater torque capacity is needed on the second stage, then more than two planet gears may be stacked at each location on the carrier to meet the necessary torque capacity.

In other implementations, the reverser planetary gearset may include stacked planets such that each location on the carrier may have two or more planets to meet a desired torque capacity. Stacked planet gears may be utilized in other complex planetary configurations besides the standard planetary configuration and the reverser planetary configuration.

Figure 2:
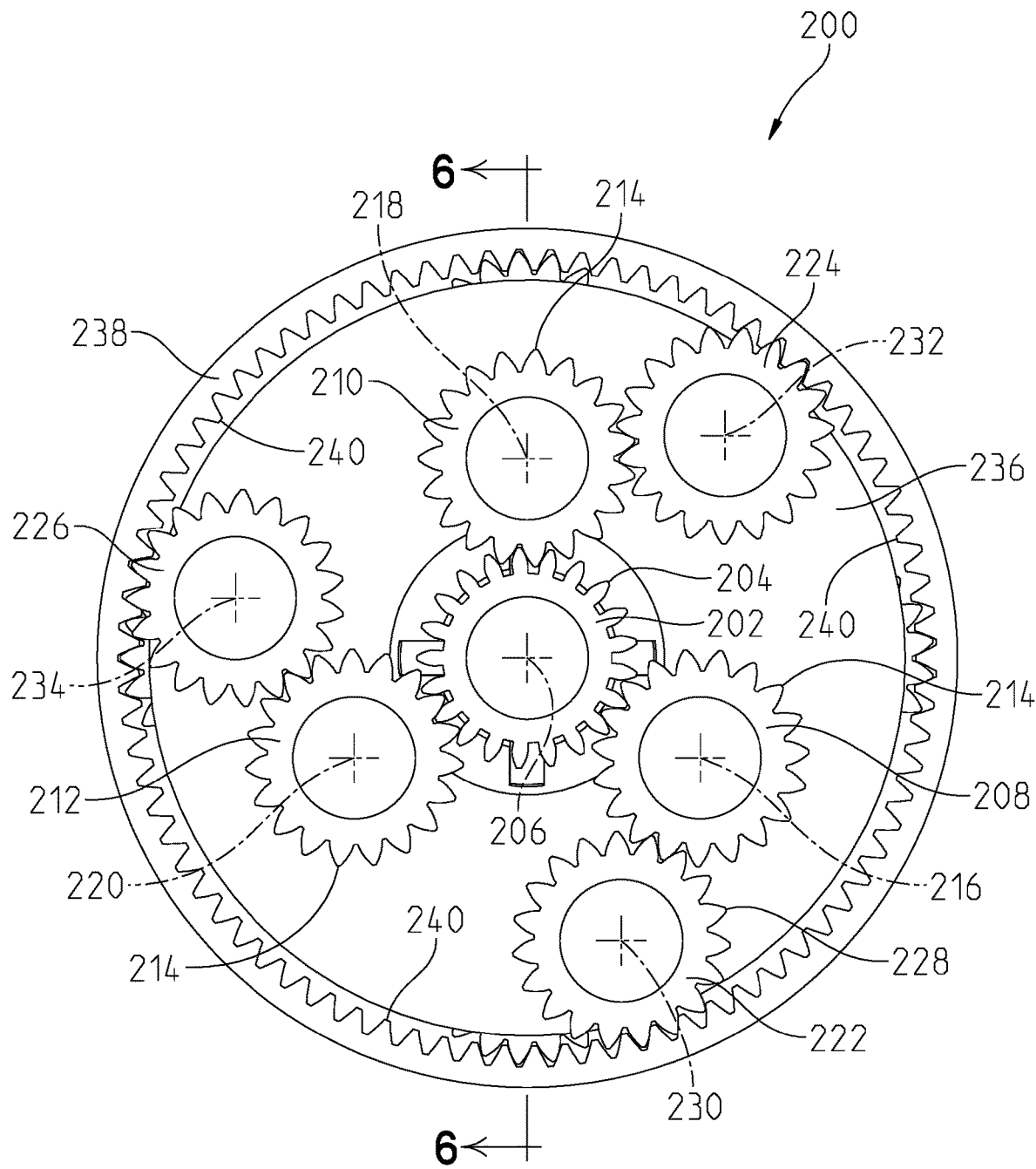
FIG. 2 is a front view of one example of a first stage planetary assembly of a complex planetary assembly.

Referring to FIGS. 2-6 of the present disclosure, one implementation of a complex planetary assembly 400 is shown having a first stage reverser planetary assembly 200 and a second stage planetary assembly 300. In the implementation of FIG. 2, the first stage reverser planetary assembly 200 includes a sun gear 202 having a plurality of external teeth 204 formed about the outer diameter of the sun gear 202. The sun gear 204 may be arranged along a rotational axis 206 as shown.

The first stage reverser planetary assembly 200 also includes a carrier 236 to which a plurality of idler planet gears and planet gears are coupled. In FIG. 2, for example, a first idler planet gear 208, a second idler planet gear 210, and a third idler planet gear 212 include external teeth for mating with the external teeth 204 of the sun gear 202. Specifically, the first idler planet gear 208 includes external teeth 214 such that the first idler gear 208 may be rotatably driven about a first idler axis 216. The second idler planet gear 210 includes external teeth 214 for also mating with the external teeth 204 of the sun gear as the second idler gear 210 rotates about a second idler axis 218. Further, the third idler planet gear 212 includes external teeth 214 for also mating with the external teeth 204 of the sun gear as the second idler gear 210 rotates about a third idler axis 220.

As shown in FIG. 2, the first stage reverser planetary assembly 200 includes a first planet gear 222, a second planet gear 224, and a third planet gear 226. The number of planet gears corresponds with the number of idler gears. In other implementations, there may be additional idler and planet gears. The first planet gear 222 may include external teeth 228 for engaging with the external gear teeth 214 on the first idler planet gear 208. The first planet gear 222 may be rotated about a first planet axis 230. The second planet gear 224 may include external teeth for engaging with the external teeth 214 on the second idler planet gear 210. The second planet gear 224 may be rotated about a second planet axis 232. Moreover, the third planet gear 226 may include external teeth for engaging with the external teeth 214 on the third idler planet gear 212. The third planet gear 226 may be rotated about a third planet axis 234.

The first stage reverser planetary assembly 200 also includes a ring gear 238. The ring gear 238 includes at least internal teeth 240 for engaging with the external teeth of the first, second and third planet gears.

Figure 3:
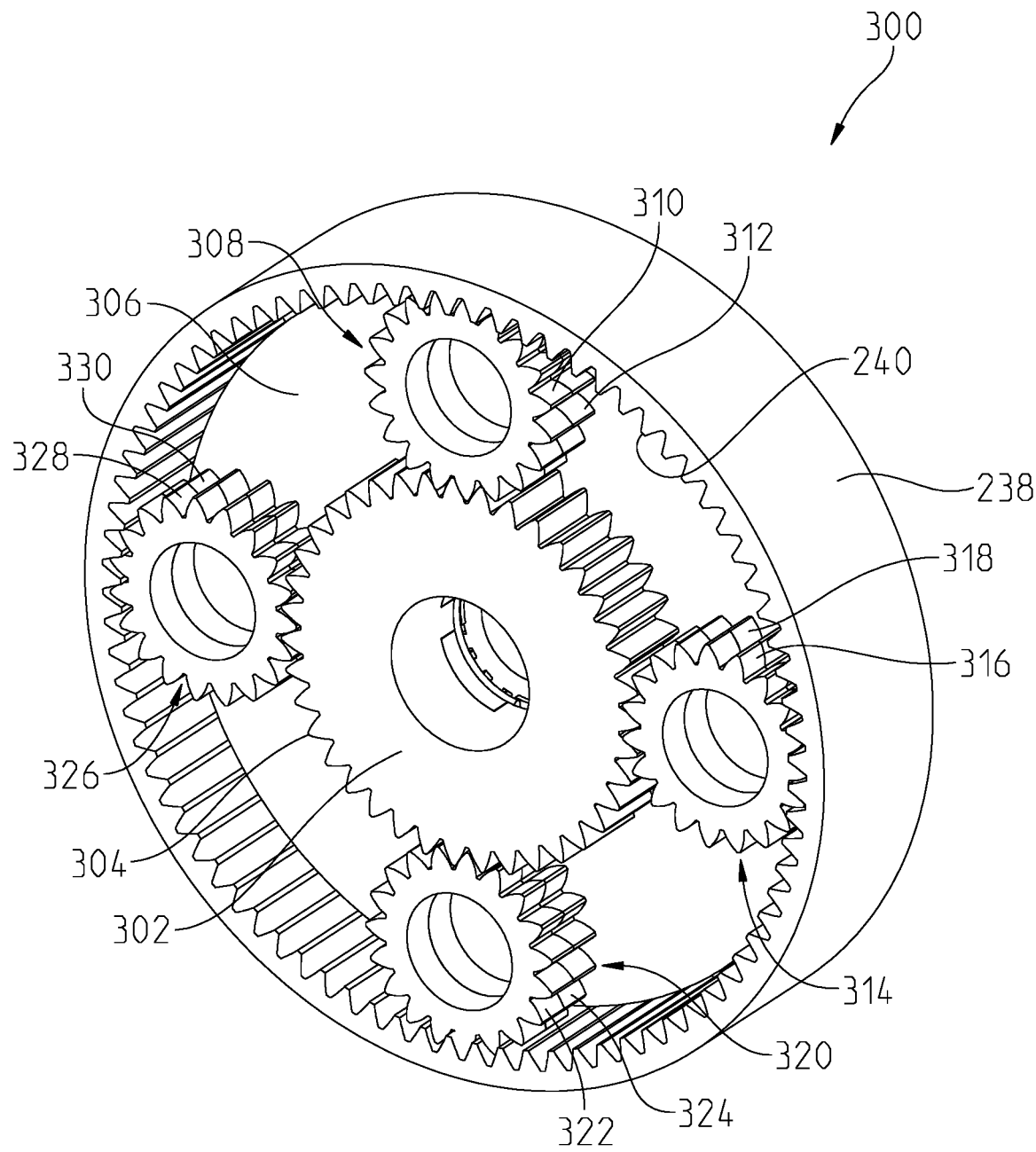
FIG. 3 is a perspective view of one example of a second stage planetary assembly of a complex planetary assembly.

Referring to FIG. 3, the second stage planetary assembly 300 is shown including a sun gear 302 having at least external teeth 304 for engaging a plurality of planet gears. The plurality of planet gears may be arranged and coupled to a carrier 306. In this implementation, the plurality of planet gears includes a first planet gear assembly 308, a second planet gear assembly 314, a third planet gear assembly 320 and a fourth planet gear assembly 326. In other implementations, there may be fewer planet gear assemblies. In some implementations, there may be additional planet gear assemblies. In any event, in FIG. 3, the first planet gear assembly 308 may include at least a first planet gear 310 and a second planet gear 312. As shown, the first planet gear 310 and second planet 312 are arranged coaxially with one another in a side-by-side or stacked arrangement. In some examples, the first planet gear 310 may be coaxially coupled to the carrier 306 as the second planet gear 312 with a gap formed therebetween. In other examples, the first and second planet gears 310, 312 may be in direct contact with one another. In yet other examples, there may be additional planet gears arranged coaxial with the first and second planet gears and coupled to the carrier 306. The first and second planet gears 310, 312 may include external teeth for engaging with the internal teeth 240 of the ring gear 238 and the external teeth 304 of the sun gear 302.

In the implementation of FIG. 3, the second planet gear assembly 314 may include a first planet gear 316 and a second planet gear 318. The first and second planet gears 316, 318 may include external teeth for engaging with the internal teeth 240 of the ring gear 238 and the external teeth 304 of the sun gear 302. In some examples, the first planet gear 316 may be coaxially coupled to the carrier 306 as the second planet gear 318 with a gap formed therebetween. In other examples, the first and second planet gears 316, 318 may be in direct contact with one another. In yet other examples, there may be additional planet gears arranged coaxial with the first and second planet gears and coupled to the carrier 306.

As also shown in FIG. 3, the third planet gear assembly 320 may include a first planet gear 322 and a second planet gear 324. The first and second planet gears 322, 324 may include external teeth for engaging with the internal teeth 240 of the ring gear 238 and the external teeth 304 of the sun gear 302. In some examples, the first planet gear 322 may be coaxially coupled to the carrier 306 as the second planet gear 324 with a gap formed therebetween. In other examples, the first and second planet gears 322, 324 may be in direct contact with one another. In yet other examples, there may be additional planet gears arranged coaxial with the first and second planet gears and coupled to the carrier 306.

Further, in the implementation of FIG. 3, the fourth planet gear assembly 326 may include a first planet gear 328 and a second planet gear 330. The first and second planet gears 328, 330 may include external teeth for engaging with the internal teeth 240 of the ring gear 238 and the external teeth 304 of the sun gear 302. In some examples, the first planet gear 328 may be coaxially coupled to the carrier 306 as the second planet gear 330 with a gap formed therebetween. In other examples, the first and second planet gears 328, 330 may be in direct contact with one another. In yet other examples, there may be additional planet gears arranged coaxial with the first and second planet gears and coupled to the carrier 306.

Figure 4:
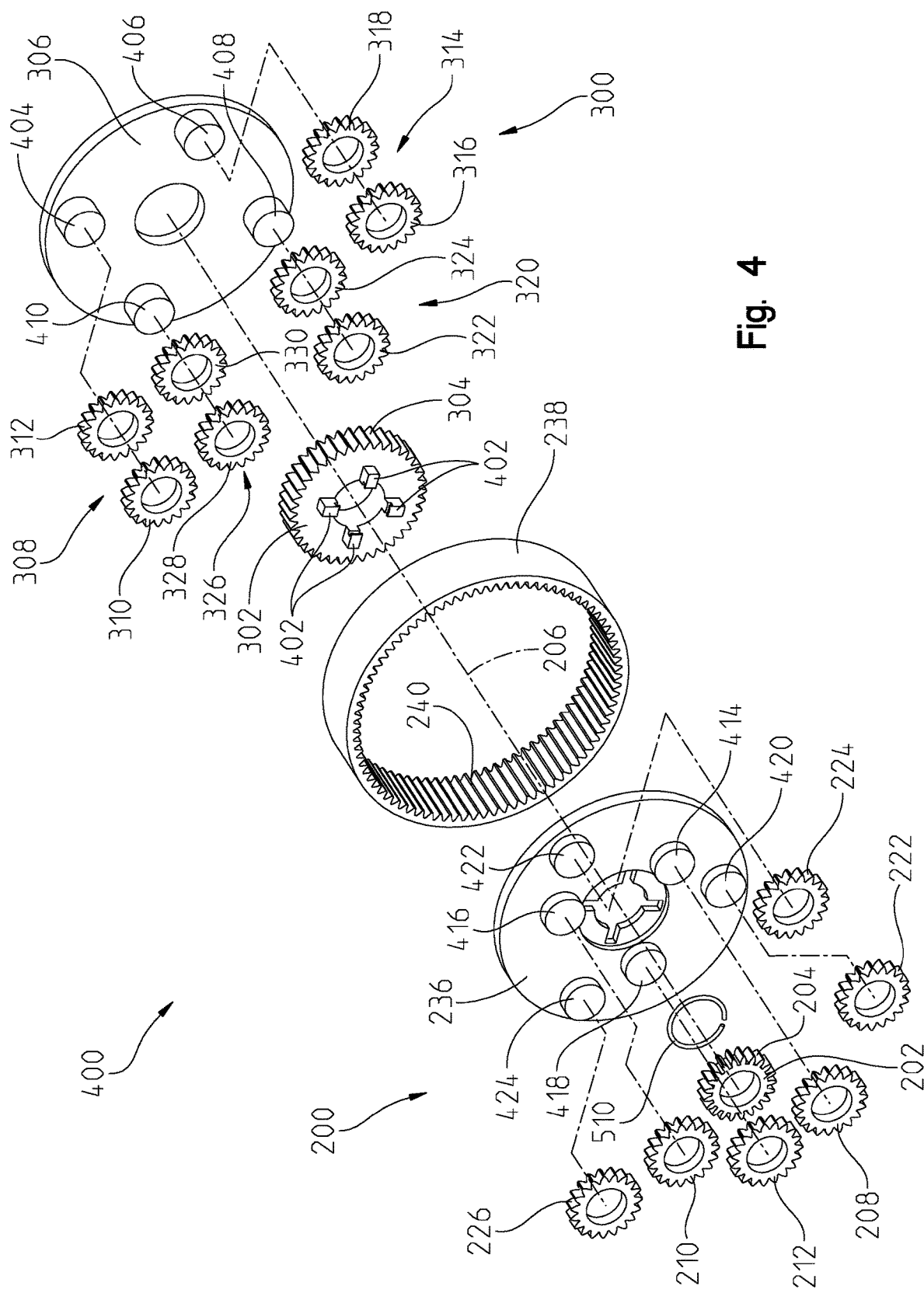
FIG. 4 is an exploded view of the example first and second stage planetary assemblies of FIGS. 2 and 3.
Figure 5:
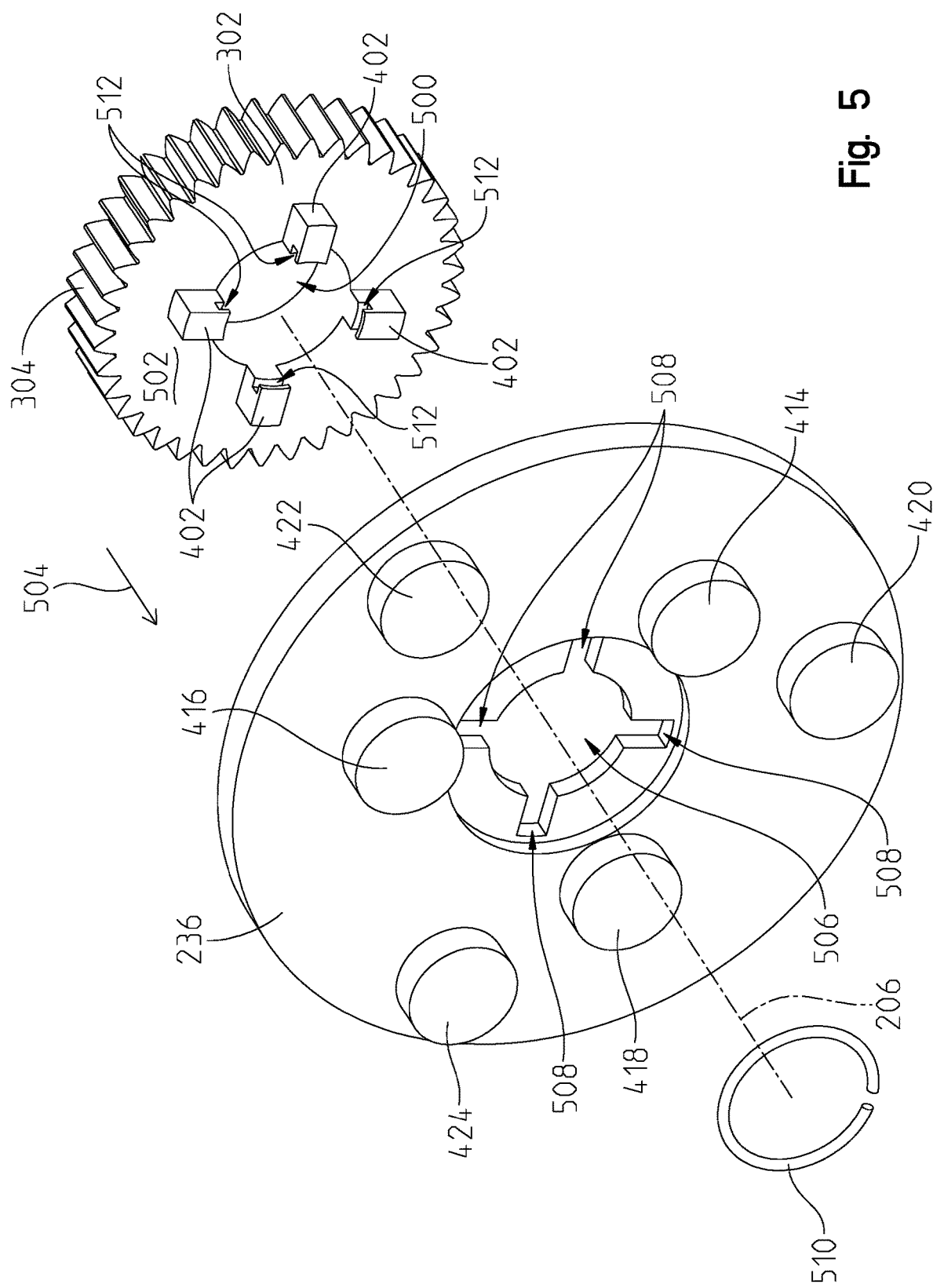
FIG. 5 is a perspective view of an example carrier and example sun gear assembly.

Referring to FIG. 4, the complex planetary assembly 400 is shown in further detail. The sun gear 302, for example, is shown including a plurality of external teeth 304 and a plurality of coupling elements 402 that extend or protrude from a first face 502 of the sun gear 302. As shown in FIG. 5, the plurality of coupling elements 402 extend away from first face 502 of the sun gear 302 in a direction indicated by arrow 504. In FIGS. 4 and 5, the plurality of coupling elements 402 are configured as block-shaped protrusions. Each of the plurality of coupling elements 402 further includes a groove 512 formed therein. A snap ring 512 may be disposed within the grooves 512 of the coupling elements 402 for coupling the sun gear 302 to the carrier 236. In particular, the carrier 236 includes an inner radial portion that defines an opening 506 and a plurality of keyhole openings 508 as shown in FIG. 5. Each of the keyhole openings 508 may be equidistantly spaced radially about the axis 206 and from one another. Further, each keyhole opening 508 may receive one of the plurality of coupling elements 402. The snap ring 510 may be disposed within the grooves 512 formed in each coupling element 402 to couple the sun gear 302 to the carrier 236. As shown in FIG. 5, the sun gear 302 further defines an opening 500 along axis 206, and the opening 500 is coaxial with the opening 506 formed in the carrier 236.

In some implementations, the carrier 236 includes several locations where an idler planet gear and a planet gear may be coupled. In FIG. 4, for example, the carrier 236 includes a first idler pin 414, a second idler pin 416, and a third idler pin 418. Each pin extends outward from a face of the carrier 236. The first idler gear 208 may be coupled to the carrier 236 at the first idler pin 414, the second idler gear 210 may be coupled to the carrier 236 at the second idler pin 416, and the third idler gear 212 may be coupled to the carrier 236 at the third idler pin 418. Although not shown in FIG. 4, a bearing or bushing may be disposed between each idler gear and idler pin to facilitate a smooth rotation of the idler gear about the respective pin. Moreover, in the implementation of FIG. 4, the carrier 236 includes a first pin 420, a second pin 422, and a third pin 424. Here, the first planet gear 222 may be coupled to the carrier 236 at the first pin 420, the second planet gear 224 may be coupled to the carrier 236 at the second pin 422, and the third planet gear 226 may be coupled to the carrier 236 at the third pin 424. A bearing or bushing may be located between the respective planet gear and pin to facilitate rotation of the planet gear about the respective pin.

Moreover, the carrier 306 of the second stage planetary assembly 300 may be similar to the carrier 236 of the first stage reverser planetary assembly 200 in that the carrier 306 includes one or more locations where a planet gear may be coupled to the carrier 306. In the implementation of FIG. 4, for example, the carrier 306 includes a first pin 404, a second pin 406, a third pin 408, and a fourth pin 410. In other implementations, additional or fewer pins may be formed on the carrier 306 to enable additional or fewer planet gears to be coupled thereto. Each of the pins extends outwardly from a face of the carrier 306 as shown in FIG. 4. In this implementation, the first planet gear assembly 308 is coupled to the first pin 404, the second planet gear assembly 314 is coupled to the second pin 406, the third planet gear assembly 320 is coupled to the third pin 408, and the fourth planet gear assembly 326 is coupled to the fourth pin 410. As described previously, each planet gear assembly may include one or more planet gears. In FIGS. 2-6, for example, two planet gears are arranged coaxially with one another to form a planet gear assembly. Thus, in FIG. 4, the first planet gear 310 and the second planet gear 312 of the first planet gear assembly 308 are coupled to the first pin 404, the first planet gear 316 and the second planet gear 318 of the second planet gear assembly 314 are coupled to the second pin 406, the first planet gear 322 and the second planet gear 324 of the third planet gear assembly 320 are coupled to the third pin 408, and the first planet gear 328 and the second planet gear 330 of the fourth planet gear assembly 326 are coupled to the fourth pin 410. In other implementations, each planet gear assembly may include three or more planet gears. In some implementations, each planet gear assembly may include one planet gear. In several implementations, the number of planet gears is the same for each planet gear assembly. In some implementations, each planet gear is the same for each planet gear assembly coupled to the carrier 306. Moreover, in several implementations, each planet gear and idler gear coupled to the carrier 236 and carrier 306 are identical.

Figure 6:
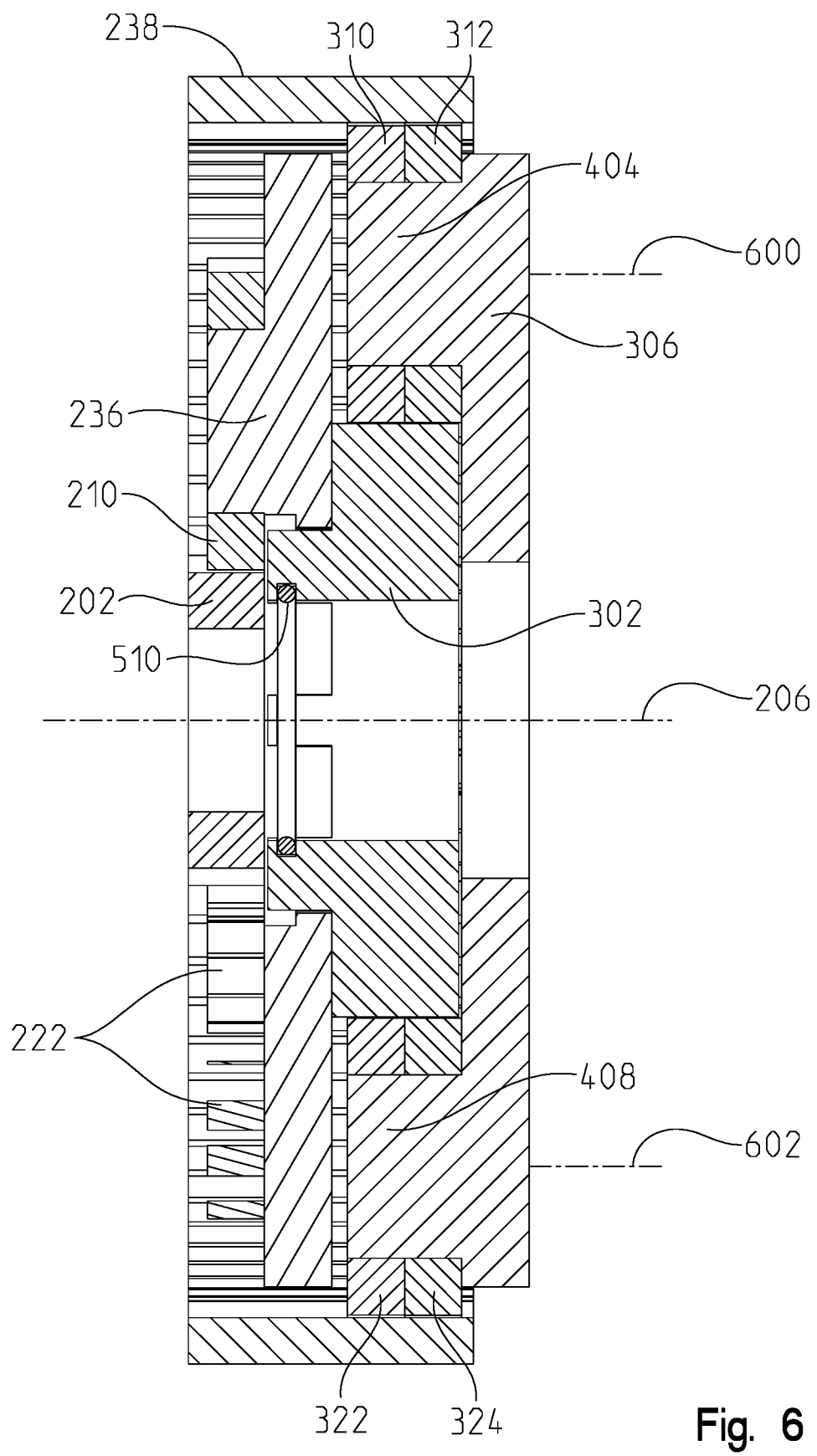
FIG. 6 is a cross-sectional view of the example first and second planetary stage planetary assemblies of FIGS. 2 and 3.

The connection of the complex planetary assembly 400 is further shown in the implementation illustrated in FIG. 6. The first planet gear 310 and second planet gear 312 of the first planet gear assembly 308 is shown aligned coaxially along a first rotational axis 600. In the same way, the first planet gear 322 and second planet gear 324 of the third planet gear assembly 320 is shown aligned coaxially along a second rotational axis 602. Each planet gear in a corresponding planet gear assembly is aligned along a rotational axis. Moreover, each planet gear in each planet gear assembly is matingly coupled between the sun gear 302 and the ring gear 238. Thus, torque may be transferred between the sun gear 302 and ring gear 238 via the planet gear assemblies. This mating engagement between teeth or splines of each gear is shown in FIG. 6 to enable the torque transfer through the complex planetary assembly 400. Moreover, the ring gear 238 may span across both stages of the complex planetary assembly 400 such that the ring gear 238 is matingly engaged with each of the planet gears on the first and second stage planetary assemblies. Although not shown in FIGS. 2-6, a shaft such as a pump or drive shaft may rotationally drive the sun gear 202 on the first stage reverser planetary assembly 200 or the sun gear 302 on the second stage planetary assembly 300. A torque output may come from one of the sun gears 202, 302, carriers 236, 306 or ring gear 238 of the complex planetary assembly 400.

As describe above, for each planet gear assembly that includes more than one planet gear, each planet gear of the planet gear assembly is located on the same pin of the carrier. Each planet gear is stacked or arranged on the pin such that each planet gear is disposed along the same rotational axis.

In some implementations, each planet gear is the same on both stages of the complex planetary assembly. For example, each planet gear may have the same module, diameter, thickness, number of teeth, or other known characteristics associated with a gear. Module is defined as the ratio of gear teeth to pitch diameter of the gear. Module may be used to determine or define a size of the gear. In some applications, each planet gear has a part number. Using the same planet gear on both stages of the complex planetary assembly 400 reduces the number of parts and can reduce cost. In several implementations, the idler planet gears may be the same as the planet gears. In other words, the idler planet gears and planet gears may have the same module, diameter, thickness, number of teeth, or other characteristics associated with a gear. In some applications, the same part number may be used for the idler planet gears and planet gears in a corresponding complex planetary assembly to reduce the total number of parts and overall cost of the assembly.

In the implementations of FIGS. 2-6, the first stage reverser planetary assembly 200 is illustrated with three idler planet gears and three planet gears, and the second stage planetary assembly 300 is shown having a carrier with four locations where planet gears are coupled. In other implementations, the first stage reverser planetary assembly 200 may include any number of idler gears and planet gears. For instance, in one example, the assembly 200 may include at least one idler gear and planet gear. In another example, the assembly 200 may include at least two idler and planet gears. In a further example, the assembly 200 may include at least four idler and planet gears. In the same way, other implementations of the second stage planetary assembly 300 may include any number of planet gears. In one example, the carrier 206 may include at least one location where one or more planet gears may be coupled. In another example, the carrier 206 may include at least two locations where one or more planet gears may be coupled. In a further example, the carrier 206 may include at least three locations where one or more planet gears may be coupled. In yet another example, the carrier 206 may include at least five locations where one or more planet gears may be coupled.

In addition, while the first stage planetary assembly is a reverser planetary configuration and the second stage planetary assembly is a standard planetary configuration, other implementations of a complex planetary assembly may include other planetary configurations. Thus, this disclosure is not limited to only standard and reverser planetary configurations.

In FIGS. 7-10, another implementation of a complex planetary assembly is illustrated. The complex planetary assembly 836 may include a first stage planetary assembly 700 and a second stage planetary assembly 800. The first stage planetary assembly 700 is illustrated as a reverser planetary configuration and the second stage planetary assembly 800 is illustrated as a standard planetary configuration.

Figure 7:
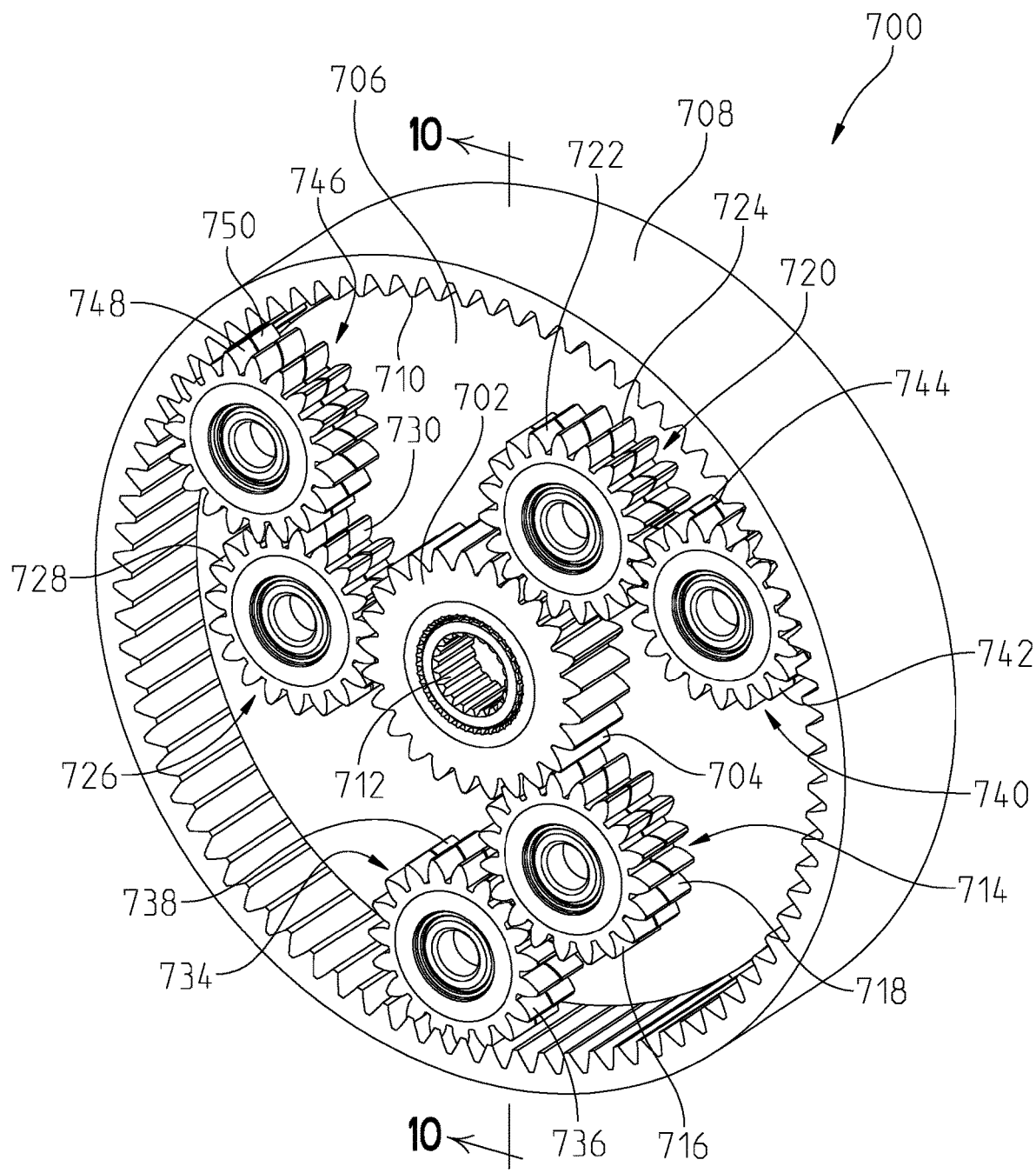
FIG. 7 is a perspective view of an example first stage planetary assembly of a complex planetary assembly.

In FIG. 7, the first stage reverser planetary assembly 700 includes a sun gear 702 having a plurality of external teeth 704 formed about an outer diameter of the sun gear 702. The sun gear 702 also includes internal teeth or splines 712 formed about an inner diameter thereof. The inner diameter of the sun gear 702 further defines a central opening 812 and rotation axis 838 about which the sun gear 702 rotates.

A ring gear 708 is shown in FIGS. 7-10 having a plurality of internal gear teeth 710 for meshing with gear teeth of one or more planet gears as will be described below. The ring gear 708 may be coupled to both the first stage reverser planetary assembly 700 and the second stage planetary assembly 800 as shown. In other words, the complex planetary assembly 836 includes a single ring gear 708 that is shared between both stages of the assembly 836 and allows for the transfer of torque therebetween.

The first stage reverser planetary gearset 700 includes a carrier 706 to which a plurality of idler planet gears and planet gears are coupled. The carrier 706 may include one or more locations where an idler planet gear and a planet gear are coupled thereto. In FIG. 7, for example, the carrier 706 includes three locations to which an idler planet gear is coupled and three locations to which a planet gear is coupled thereto. More specifically, a first idler assembly 714, a second idler assembly 720, and a third idler assembly 726 are shown. Each idler assembly may include one or more idler planet gears. In the illustrated implementation of FIG. 7, each idler assembly includes two idler planet gears. In other implementations, each idler assembly may include three or more idler planet gears. Moreover, each idler planet gear in an idler assembly is the same. In other words, in the first idler assembly 714, a first idler planet gear 716 and a second idler planet gear 718 are disclosed. The first idler planet 716 and second idler planet gear 718 may be substantially the same. For example, the first and second idler planet gears 716, 718 may include the same module, diameter, thickness, or number of teeth. In some implementations, the first and second idler planet gears 716, 718 may include the same of one or more module, diameter, thickness, and number of teeth. In one implementation, the first and second idler planet gears 716, 718 are identical in that each includes the same module, diameter, thickness, and number of teeth.

In FIG. 7, the second idler assembly 720 includes a first idler planet gear 722 and a second idler planet gear 724 and the third idler assembly 726 includes a first idler planet gear 728 and a second idler planet gear 730. In some implementations, the first and second idler planet gears of the first, second and third idler assemblies include one or more of the same module, diameter, thickness, and number of teeth. In at least one implementation, the first and second idler planet gears of the first, second and third idler assemblies include the same module, diameter, thickness, and number of teeth. Thus, in this implementation, the characteristics that define each idler planet gear is the same for each idler assembly.

As shown in FIG. 7, the first and second idler planet gears of each idler assembly engages with the external teeth 704 of the sun gear 702. Thus, torque may be transferred between the idler planet gears and the sun gear 702. Further, each idler assembly is coupled to a corresponding planet gear assembly. For example, the first idler assembly 714 is connected to a first planet gear assembly 734. The first planet gear assembly 734 includes a first planet gear 736 and a second planet gear 738. In one example, the first planet gear 736 may engage with the first idler planet gear 716 and the second planet gear 738 may engage with the second idler planet gear 718. In some implementations, one of the idler planet gears may overlap and engage with both planet gears or one of the planet gears may overlap and engage with both idler planet gears.

Moreover, the first stage reverser planetary assembly 700 includes a second planet gear assembly 740 having a first planet gear 742 and a second planet gear 744 and a third planet gear assembly 746 having a first planet gear 748 and a second planet gear 750. The second planet gear assembly 740 is connected to the second idler assembly 720 and the third planet gear assembly 746 is connected to the third idler assembly 726.

In one example, the first planet gear 742 of the second planet gear assembly 740 may engage with the first idler planet gear 722 of the second idler assembly 720. In the same way, the second planet gear 744 of the second planet gear assembly 740 may engage with the second idler planet gear 724 of the second idler assembly 720. In another example, the first planet gear 748 of the third planet gear assembly 746 may engage with the first idler planet gear 728 of the third idler assembly 726. In the same way, the second planet gear 750 of the third planet gear assembly 746 may engage with the second idler planet gear 730 of the third idler assembly 726. In other examples, one of the idler planet gears may overlap and engage with both planet gears or one of the planet gears may overlap and engage with both idler planet gears.

In some implementations, the first and second planet gears of the first, second and third planet gear assemblies include one or more of the same module, diameter, thickness, and number of teeth. In at least one implementation, the first and second planet gears of the first, second and third planet gear assemblies include the same module, diameter, thickness, and number of teeth. Thus, in this implementation, the characteristics that define each planet gear is the same for each planet gear assembly.

In several implementations, the first and second planet gears of the first, second and third planet gear assemblies and the first and second idler planet gears of the first, second and third idler assemblies include one or more of the same module, diameter, thickness, and number of teeth. In at least one implementation, the first and second planet gears of the first, second and third planet gear assemblies and the first and second idler planet gears of the first, second and third idler assemblies include the same module, diameter, thickness, and number of teeth. Thus, in this implementation, the characteristics that define each planet gear and idler planet gear is identical.

In some implementations, each idler assembly and each planet gear assembly includes more than one gear. In FIG. 7, for example, each idler assembly includes a pair of idler planet gears and each planet gear assembly includes a pair of planet gears. In other implementations, each idler assembly and each planet gear assembly may include three or more gears. In at least one implementation, the number of gears at each idler assembly is the same as the number of gears in each planet gear assembly. In a different implementation, the number of gears at each idler assembly may be more or less than the number of gears at each planet gear assembly. In other implementations, the number of gears at each idler assembly is the same and the number of gears at each planet gear assembly is the same. In yet other implementations, the number of gears at each idler assembly may vary and the number of gears at each planet gear assembly may vary.

Figure 8:
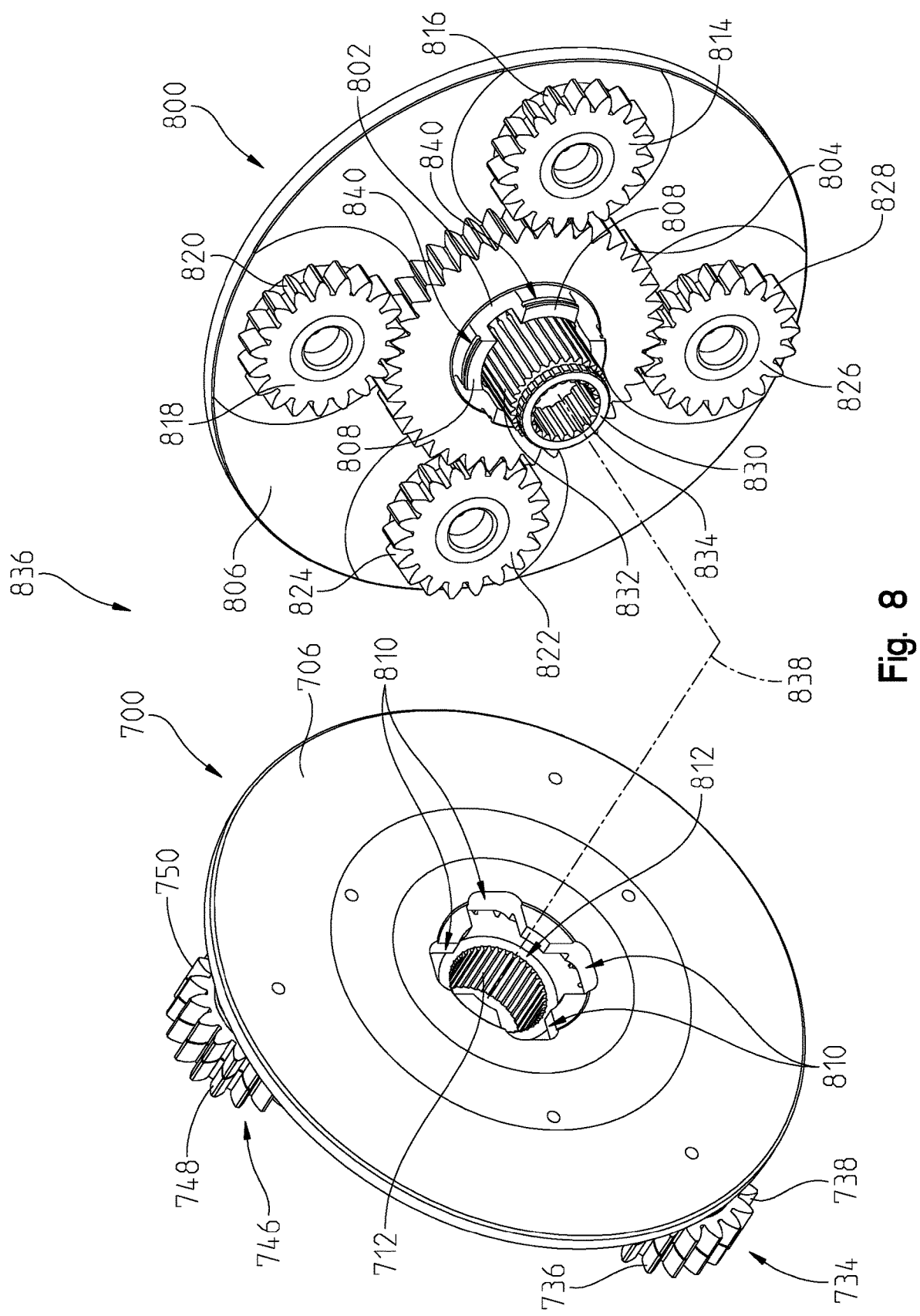
FIG. 8 is a perspective view of the example first stage planetary assembly of FIG. 7 and an example second stage planetary assembly of a complex planetary assembly.

Referring to FIG. 8, the second stage planetary assembly 800 is shown. The second stage planetary assembly 800 includes a sun gear 802 having a plurality of external teeth 804 formed about an outer diameter of the sun gear 802. A carrier 806 is also provided and includes one or more locations to which a planet gear is coupled. In FIG. 8, the carrier 806 includes a plurality of locations to which planet gears are connected. For example, a first planet gear 814 having gear teeth 816, a second planet gear 818 having gear teeth 820, a third planet gear 822 having gear teeth 824, and a fourth planet gear 826 having gear teeth 828 are shown coupled to the carrier 806. Although not illustrated to scale, the gear teeth of the first, second, third and fourth planet gears 814, 818, 822, 826 may matingly engage with the gear teeth 804 of the sun gear 802. Moreover, the gear teeth on each planet gear may matingly engage with the gear teeth 710 of the ring gear 708.

In the implementation of FIG. 8, the sun gear 802 is shown including a plurality of coupling elements 808 that extend or protrude from a face of the sun gear 802. As shown, the plurality of coupling elements 808 extend away from face of the sun gear 802. Each of the plurality of coupling elements 808 further includes a groove 840 formed therein. A snap ring (not shown in FIG. 8 but similar to the snap ring 512 of FIG. 5) may be disposed within the grooves 840 of the coupling elements 808 for coupling the sun gear 802 to the carrier 706. In particular, the carrier 706 includes an inner radial portion that defines the opening 812 and a plurality of keyhole openings 810 as shown in FIG. 8. Each of the keyhole openings 810 may be equidistantly spaced radially about the axis 838 and from one another. Further, each keyhole opening 810 may receive one of the plurality of coupling elements 808. The snap ring may then be disposed within the grooves 840 formed in each coupling element 808 to couple the sun gear 802 to the carrier 706.

Figure 9:
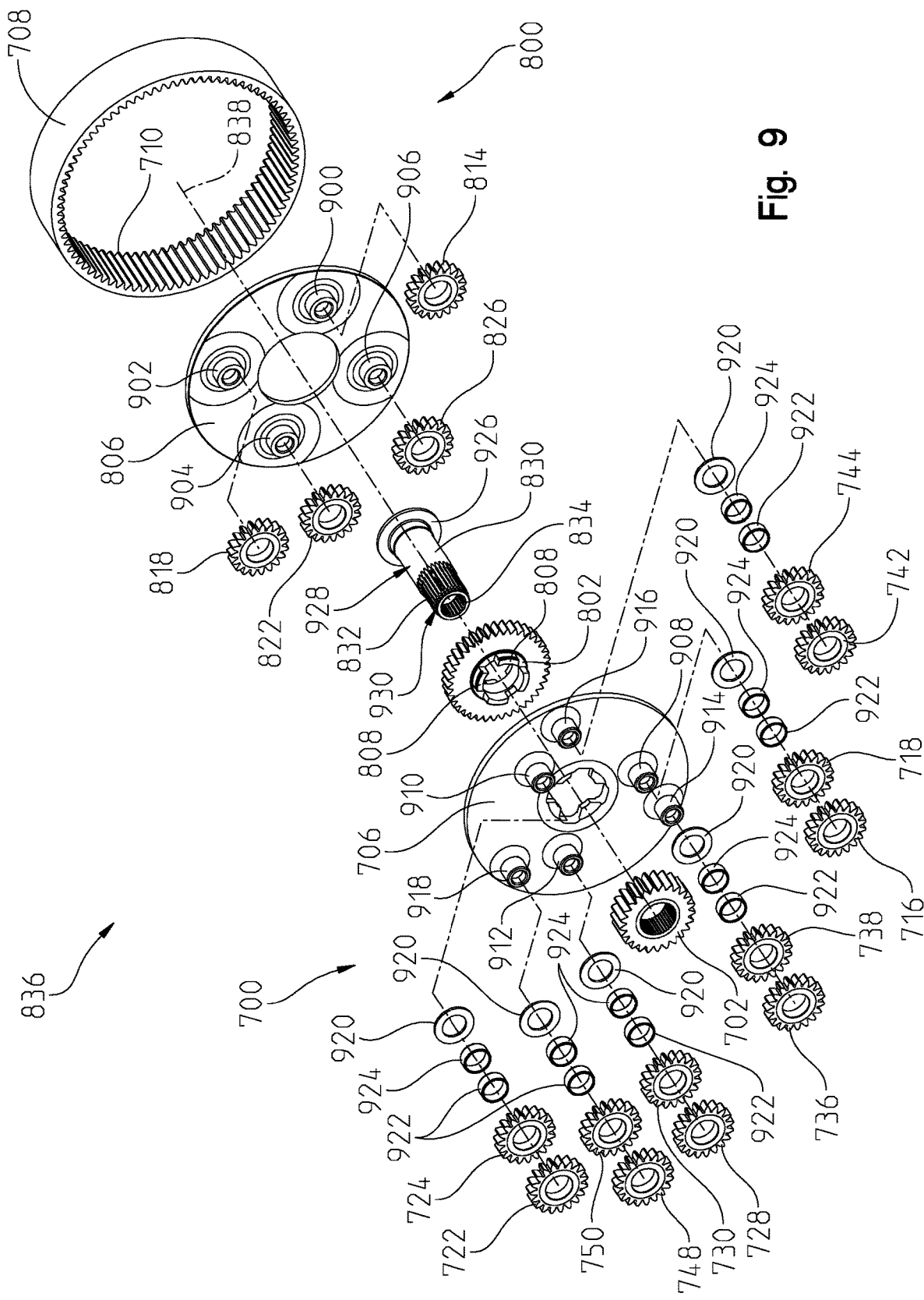
FIG. 9 is an exploded view of the example first and second stage planetary assemblies of FIGS. 7 and 8.
Figure 10:
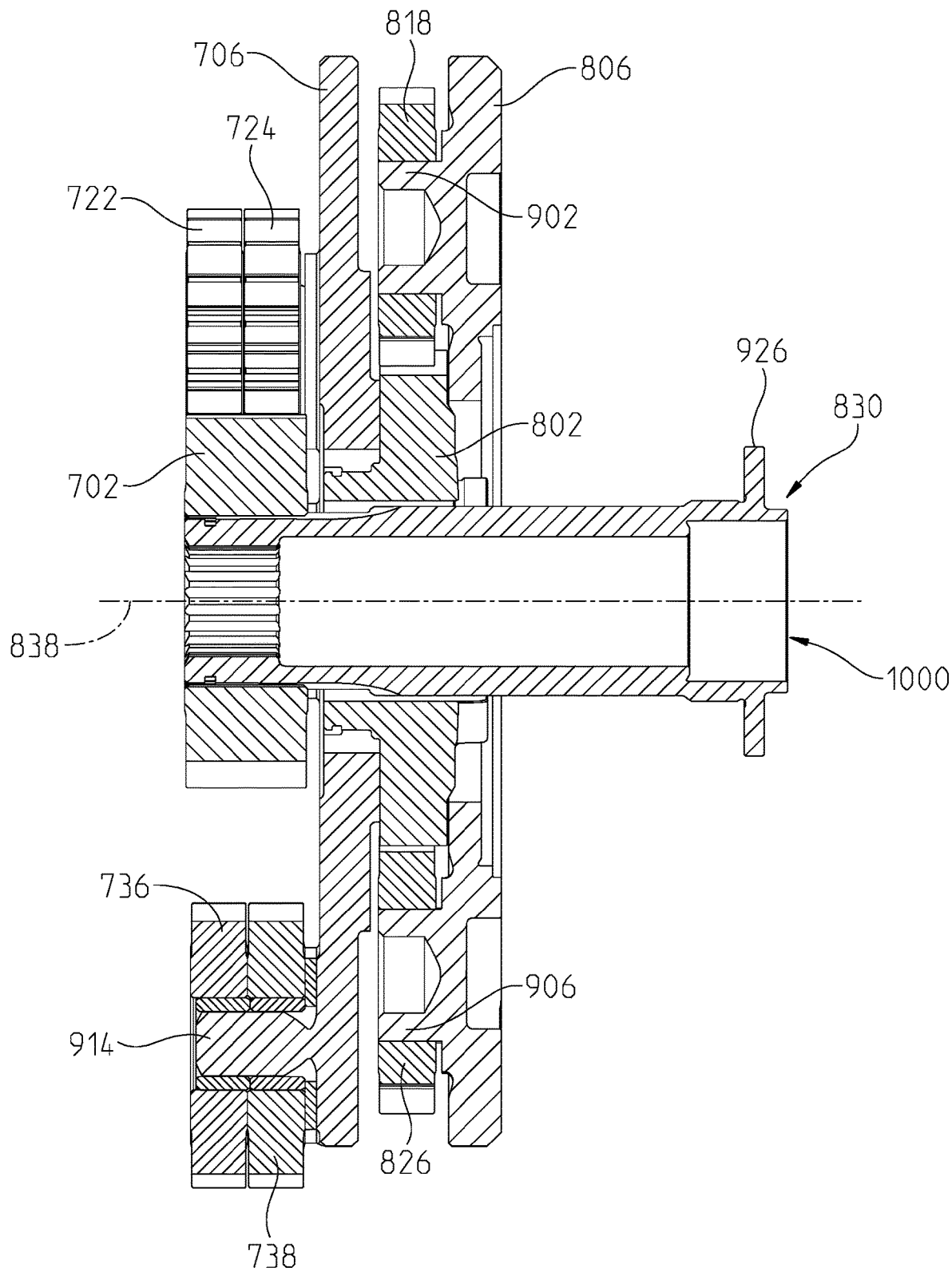
FIG. 10 is a cross-sectional view of the example first and second planetary stage planetary assemblies of FIGS. 7 and 8.

As shown in FIGS. 8-10, a shaft 830 such as a drive shaft or pump shaft is shown. The shaft 830 may be an input shaft which transfers torque from a power-producing device such as an engine 102 or electric machine 118, 120, 122 to the complex planetary assembly 836. The shaft 830 in FIG. 8 includes external splines 832 and internal splines 834. The external splines 832 may matingly engage with the internal teeth or splines 712 of the sun gear 702. The internal splines 834 may matingly engage with another shaft (not shaft) or other device. In FIG. 9, for example, the implementation of the shaft 830 may be such that the outer diameter thereof may include a splined portion 930 including the external splines 832 and a non-splined portion 928. The shaft 830 also includes a flange portion 926 as shown in FIG. 9 and an internal passageway or channel 1000 as shown in FIG. 10. The passageway 1000 is aligned along the rotation axis 838.

Referring to the implementation of FIG. 9, each of the carriers 706, 806 are shown with the planet gears and idler planet gears removed therefrom. Each carrier includes one or more pins to which the planet gears and idler planet gears are coupled. Each pin defines a rotation axis about which the gears rotate relative to the carrier. Further, each pin is equidistantly spaced radially about the carrier and from one another. More specifically, each pin is radially spaced from the axis 838 at the same radial distance as the other pins. For the first stage reverser planetary assembly 700, each pin to which an idler planet gear is coupled is spaced by the same radial distance as the other pins to which idler planet gears are coupled. In the same way, each pin to which a planet gear is coupled to the carrier 706 is spaced radially by the same radial distance as the other pins to which planet gears are coupled.

The first carrier 706 of the first stage reverser planetary assembly 700 includes a first idler pin 908, a second idler pin 910, and a third idler pin 912. The first carrier 706 also includes a first pin 914, a second pin 916, and a third pin 918. As shown in FIG. 9, the first idler assembly 714 is coupled to the first idler pin 908. Specifically, the first idler planet gear 716 and second idler planet gear 716 are coupled to the first idler pin 908, and the first idler pin 908 defines a rotational axis by which the first and second idler planet gears rotate. Thus, the first and second idler planet gears share the same axis, i.e., are coaxial, and stacked or arranged adjacent to one another on the first idler pin 908.

The second idler assembly 720 is coupled to the second idler pin 910. Specifically, the first idler planet gear 722 and second idler planet gear 724 are coupled to the second idler pin 910, and the second idler pin 910 defines a rotational axis by which the first and second idler planet gears rotate. Thus, the first and second idler planet gears share the same axis, i.e., are coaxial, and stacked or arranged adjacent to one another on the second idler pin 910.

The third idler assembly 726 is coupled to the third idler pin 912. Specifically, the first idler planet gear 728 and second idler planet gear 730 of the third idler assembly 726 are coupled to the third idler pin 912, and the third idler pin 912 defines a rotational axis by which the first and second idler planet gears rotate. Thus, the first and second idler planet gears share the same axis, i.e., are coaxial, and stacked or arranged adjacent to one another on the third idler pin 912.

In the implementation of FIG. 9, the first planet gear assembly 734 is coupled to the first pin 914. Specifically, the first planet gear 736 and second planet gear 738 are coupled to the first pin 914, and the first pin 914 defines a rotational axis by which the first and second planet gears rotate. Thus, the first and second planet gears share the same axis, i.e., are coaxial, and stacked or arranged adjacent to one another on the first pin 914.

In addition, the second planet gear assembly 740 is coupled to the second pin 916. Specifically, the first planet gear 742 and second planet gear 744 are coupled to the second pin 916, and the second pin 916 defines a rotational axis by which the first and second planet gears rotate. Thus, the first and second planet gears share the same axis, i.e., are coaxial, and stacked or arranged adjacent to one another on the second pin 916.

Further, the third planet gear assembly 746 is coupled to the third pin 918. Specifically, the first planet gear 748 and second planet gear 750 are coupled to the third pin 918, and the third pin 918 defines a rotational axis by which the first and second planet gears rotate. Thus, the first and second planet gears share the same axis, i.e., are coaxial, and stacked or arranged adjacent to one another on the third pin 918.

In the implementation of FIG. 9, each pin location further includes a bearing and at least one bushing per gear. For example, at the first pin 914, a bearing 920, a first bushing 922 and a second bushing 924 are provided. The bearing 920 is positioned or located in contact with or adjacent to the face of the carrier 706. The second planet gear 738 is coupled to the first pin 914 and positioned against or in close proximity to the bearing 920. The second bushing 924 may be coupled to an internal diameter of the second planet gear 738. Further, the first planet gear 736 may be coupled to the first pin 914 such that the first bushing 922 is located in the inner diameter of the first planet gear 736. In this arrangement, the first and second bushings 922, 924 are disposed in contact with the first pin 914. The coupling of bearings and bushings is the same for the idler planet gears and other planet gears in FIG. 9.

The second carrier 806 also includes a number of pins to which planet gears are coupled. In FIG. 9, for example, the second carrier 806 of the second stage planetary assembly 800 includes a first pin 900, a second pin 902, a third pin 904, and a fourth pin 906. The first planet gear 814 is coupled to the first pin 900. Although not shown, a bearing and bushing may be provided in some implementations similar to that shown with respect to the first carrier 706. The first pin 900 defines a rotational axis about which the first planet gear 814 rotates. The first planet gear 814 may rotate about the rotational axis as it is in engagement with the sun gear 802 and ring gear 708.

The second planet gear 818 is coupled to the second pin 902. Although not shown, a bearing and bushing may be provided in some implementations similar to that shown with respect to the first carrier 706. The second pin 902 defines a rotational axis about which the second planet gear 818 rotates. The second planet gear 818 may rotate about the rotational axis as it is in engagement with the sun gear 802 and ring gear 708. In the same way, the third planet gear 822 is coupled to the third pin 904 and the fourth planet gear 826 is coupled to the fourth pin 906. Although not shown, a bearing and bushing may be provided in some implementations similar to that shown with respect to the first carrier 706. The third pin 904 defines a rotational axis about which the third planet gear 822 rotates and the fourth pin 906 defines a rotational axis about which the fourth planet gear 826 rotates. Each of the planet gears may engage with the sun gear 802 and ring gear 708 as described above.

While the illustrated implementations in this disclosure provide for a common ring gear that is coupled to the planet gears in the first stage and second stage planetary assemblies, in other implementations each of the first and second stage planetary assemblies may include a ring gear. Thus, there may be two ring gears—one for each stage planetary assembly. In these implementations, each stage planetary assembly may share a common sun gear or carrier to enable the transfer of torque therebetween. This disclosure is therefore not intended to be limited to only those implementations where a single ring gear is shared between the different stages of the complex planetary assembly. Instead, this disclosure includes implementations in which the different stages of the complex planetary assembly share the same sun gear or carrier, and an output from the complex planetary assembly may be via one of the ring gears.

While exemplary implementations incorporating the principles of the present disclosure have been described herein, the present disclosure is not limited to such implementations. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A complex planetary assembly, comprising:
    an input and an output;
    a ring gear;
    a first stage planetary assembly comprising:
        a first sun gear;
        a first carrier comprising a front face and a first plurality of pins extending from the first face;
        a first plurality of planet gears, each of the first plurality of planet gears being rotatably coupled to one of the first plurality of pins on the first carrier; and
    a second stage planetary assembly comprising:
        a second sun gear;
        a second carrier comprising a front face and a second plurality of pins extending therefrom;
        a second plurality of planet gears, each of the second plurality of planet gears being rotatably coupled to one of the second plurality of pins on the second carrier;
    wherein, at each of the second plurality of pins on the second carrier, at least two planet gears of the second plurality of planet gears are coupled thereto;
    wherein, the at least two planet gears of the second plurality of planet gears are coaxially arranged adjacent to one another.

2. The complex planetary assembly of claim 1, wherein the ring gear is rotatably coupled to the first plurality of planet gears and the second plurality of planet gears.

3. The complex planetary assembly of claim 1, wherein the first sun gear and second sun gear are coaxially arranged along the same rotation axis.

4. The complex planetary assembly of claim 1, wherein at each of the first plurality of pins on the first carrier, at least two planet gears of the first plurality of planet gears are coupled thereto;
    wherein, the at least two planet gears of the first plurality of planet gears are coaxially arranged adjacent to one another.

5. The complex planetary assembly of claim 1, wherein the at least two planet gears of the second plurality of planet gears are in contact with one another.

6. The complex planetary assembly of claim 1, wherein the first plurality of planet gears are identical to the second plurality of planet gears.

7. The complex planetary assembly of claim 1, wherein the first plurality of planet gears and the second plurality of planet gears comprise the same module, diameter, thickness, or number of gear teeth.

8. The complex planetary assembly of claim 1, further comprising a plurality of idler gears coupled to the first carrier, each of the plurality of idler gears is rotatably coupled to one of the first plurality of pins on the first carrier and coupled between the first sun gear and one planet gear of the first plurality of planet gears.

9. The complex planetary assembly of claim 8, wherein the first plurality of planet gears, the second plurality of planet gears, and the plurality of idler gears are identical.

10. The complex planetary assembly of claim 8, wherein the first plurality of planet gears, the second plurality of planet gears, and the plurality of idler gears comprise the same module, diameter, thickness, or number of gear teeth.

11. A complex planetary assembly, comprising:
    an input and an output;
    a ring gear;
    a first stage reverser planetary assembly comprising:
        a first sun gear;
        a first carrier comprising a front face and a first plurality of pins extending from the first face;
        a first plurality of planet gears, each of the first plurality of planet gears being rotatably coupled to one of the first plurality of pins on the first carrier;
        a plurality of idler planetary gears coupled to the first carrier, each of the plurality of idler gears being rotatably coupled to one of the first plurality of pins on the first carrier and coupled between the first sun gear and one planet gear of the first plurality of planet gears;
    a second stage planetary assembly comprising:
        a second sun gear;
        a second carrier comprising a front face and a second plurality of pins extending therefrom;
        a second plurality of planet gears, each of the second plurality of planet gears being rotatably coupled to one of the second plurality of pins on the second carrier;
    wherein, at each of the first plurality of pins on the first carrier, at least two planet gears of the first plurality of planet gears or at least two idler gears of the plurality of idler gears are coupled thereto;
    wherein, the at least two planet gears of the first plurality of planet gears and the at least two idler gears of the plurality of idler gears are coaxially arranged adjacent to one another on the respective pin.

12. The complex planetary assembly of claim 11, wherein the ring gear is rotatably coupled to the first plurality of planet gears and the second plurality of planet gears.

13. The complex planetary assembly of claim 11, wherein at each of the second plurality of pins on the second carrier, at least two planet gears of the second plurality of planet gears are coupled thereto;
    wherein, the at least two planet gears of the second plurality of planet gears are coaxially arranged adjacent to one another.

14. The complex planetary assembly of claim 11, wherein the at least two planet gears of the first plurality of planet gears are in contact with one another.

15. The complex planetary assembly of claim 11, wherein the first plurality of planet gears, the second plurality of planet gears, and the plurality of idler gears are identical to one another.

16. The complex planetary assembly of claim 11, wherein the first plurality of planet gears, the second plurality of planet gears, and the plurality of idler gears comprise the same module, diameter, thickness, or number of gear teeth.

17. The complex planetary assembly of claim 11, wherein the number of planet gears and the number of idler gears coupled to each of the first plurality of pins is the same.

18. A complex planetary assembly, comprising:
an input and an output;
a ring gear;
a first stage reverser planetary assembly comprising:
  a first sun gear;
  a first carrier comprising a front face and a first plurality of pins extending from the first face;
  a first plurality of planet gears, each of the first plurality of planet gears being rotatably coupled to one of the first plurality of pins on the first carrier;
  a plurality of idler planetary gears coupled to the first carrier, each of the plurality of idler gears being rotatably coupled to one of the first plurality of pins on the first carrier and coupled between the first sun gear and one planet gear of the first plurality of planet gears;
a second stage planetary assembly comprising:
  a second sun gear;
  a second carrier comprising a front face and a second plurality of pins extending therefrom;
  a second plurality of planet gears, each of the second plurality of planet gears being rotatably coupled to one of the second plurality of pins on the second carrier;
wherein, at each of the first plurality of pins on the first carrier, at least two planet gears of the first plurality of planet gears or at least two idler gears of the plurality of idler gears are coupled thereto;
wherein, the at least two planet gears of the first plurality of planet gears and the at least two idler gears of the plurality of idler gears are coaxially arranged adjacent to one another on the respective pin;
wherein, at each of the second plurality of pins on the second carrier, at least two planet gears of the second plurality of planet gears are coupled thereto;
wherein, the at least two planet gears of the second plurality of planet gears are coaxially arranged adjacent to one another.

19. The complex planetary assembly of claim 18, wherein the ring gear is coupled to the first plurality of planet gears and the second plurality of planet gears.

20. The complex planetary assembly of claim 18, wherein the number of planet gears of the first plurality of planet gears and the number of idler gears of the plurality of idler gears coupled to each of the first plurality of pins is the same as the number of planet gears of the second plurality of planet gears coupled to each of the second plurality of pins.

* * * * *